US010132634B2

(12) United States Patent
Kadosh et al.

(10) Patent No.: US 10,132,634 B2
(45) Date of Patent: Nov. 20, 2018

(54) INERTIAL NAVIGATION SYSTEM AND METHOD

(71) Applicant: Rafael Advanced Defense Systems Ltd., Haifa (IL)

(72) Inventors: Igal Kadosh, Tivon (IL); Michael Naroditsky, Karmiel (IL); Hector Rotstein, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 14/431,099

(22) PCT Filed: Sep. 15, 2013

(86) PCT No.: PCT/IL2013/050778
§ 371 (c)(1),
(2) Date: Mar. 25, 2015

(87) PCT Pub. No.: WO2014/049592
PCT Pub. Date: Apr. 3, 2014

(65) Prior Publication Data
US 2015/0204674 A1     Jul. 23, 2015

(30) Foreign Application Priority Data

Sep. 27, 2012   (IL) ........................................ 222221

(51) Int. Cl.
*G01C 21/16*     (2006.01)
*G01C 19/38*     (2006.01)

(52) U.S. Cl.
CPC ............. *G01C 21/16* (2013.01); *G01C 19/38* (2013.01)

(58) Field of Classification Search
USPC ........................................................ 701/500
See application file for complete search history.

(56) References Cited

U.S. PATENT DOCUMENTS

| | | | | |
|---|---|---|---|---|
| 3,222,795 A | * | 12/1965 | Gevas .................... | G01C 19/38 33/301 |
| 3,301,508 A | * | 1/1967 | Yamron ................... | B64G 1/24 244/3.18 |

(Continued)

FOREIGN PATENT DOCUMENTS

WO    WO 2011/158228 A1    12/2011

OTHER PUBLICATIONS

Patent Cooperation Treaty, International Search Report, International Patent Application No. PCT/IL2013/050778, dated Jan. 13, 2014, 2 Pages.

(Continued)

*Primary Examiner* — Jean Paul Cass
(74) *Attorney, Agent, or Firm* — Fenwick & West LLP

(57) ABSTRACT

The invention relates to an improved Inertial Navigation System (INS), which comprises: (a) an INS unit which comprises (a.1) an IMU which in turn comprises a set of at least three gyros and at least three accelerometers, all mounted on a rotatable stage; and (a.2) an INS algorithm for measuring the behavior of said gyros and said accelerometers during a mission, and calculating a navigation solution based on said measurements; and (b) a north finding determination unit, which comprises: (b.1) one or more from said IMU gyros and one or more from said IMU accelerometers; and (b.2) a north finding algorithm which utilizes measurements from said one or more north finding gyros and one or more north finding accelerometers during an initial conditions stationary state in which the stage is positioned in at least two separate stationary orientations, said north finding algorithm determines a north finding solution which is provided to the INS unit for initializing its said INS algorithm.

13 Claims, 7 Drawing Sheets

(56) References Cited

U.S. PATENT DOCUMENTS

| | | | | |
|---|---|---|---|---|
| 3,330,945 | A | * | 7/1967 | Gevas .................... G01C 19/38 318/591 |
| 3,545,092 | A | * | 12/1970 | King ....................... G01C 25/00 33/301 |
| 3,769,710 | A | * | 11/1973 | Reister ................. G01C 21/165 244/175 |
| 4,244,215 | A | * | 1/1981 | Frosch ................... G01C 21/16 73/178 R |
| 4,454,756 | A | * | 6/1984 | Sharp .................... E21B 47/022 33/313 |
| 4,632,012 | A | * | 12/1986 | Feige ........................ F41G 5/24 235/407 |
| 4,800,501 | A | | 1/1989 | Kinsky |
| 5,617,317 | A | * | 4/1997 | Ignagni ................ G01C 21/165 342/357.31 |
| 5,894,323 | A | * | 4/1999 | Kain ...................... G01C 11/02 348/116 |
| 7,066,004 | B1 | * | 6/2006 | Kohler ............... G01C 19/5719 702/88 |
| 9,230,907 | B2 | * | 1/2016 | Fornara .............. H01L 23/5223 |
| 9,453,731 | B2 | * | 9/2016 | Vos ........................ G01C 21/24 |
| 9,541,392 | B2 | * | 1/2017 | Dusha .................... G01C 15/06 |
| 2003/0135327 | A1 | * | 7/2003 | Levine ................. G01C 21/165 701/500 |
| 2004/0172838 | A1 | | 9/2004 | Satoh et al. |
| 2005/0028392 | A1 | | 2/2005 | Campbell et al. |
| 2005/0197773 | A1 | * | 9/2005 | Brewster .................. G01V 7/16 702/2 |
| 2010/0088063 | A1 | * | 4/2010 | Laughlin ................ G01C 19/38 702/151 |
| 2011/0066395 | A1 | * | 3/2011 | Judd ...................... G01C 19/56 702/104 |
| 2013/0090848 | A1 | * | 4/2013 | Kadosh .................. G01C 19/38 701/501 |
| 2015/0204674 | A1 | * | 7/2015 | Kadosh .................. G01C 19/38 701/500 |
| 2015/0219767 | A1 | * | 8/2015 | Humphreys ............ G01S 19/43 342/357.26 |

OTHER PUBLICATIONS

Patent Cooperation Treaty, Written Opinion of the Internationals Searching Authority, International Patent Application No. PCT/IL2013/050778, dated Jan. 13, 2014, 5 Pages.

European Extended Search Report, European Application No. 13841463.6, dated Apr. 20, 2016, 11 pages.

* cited by examiner

INERTIAL NAVIGATION SYSTEM AND METHOD

FIELD OF THE INVENTION

The present invention relates to an improved inertial navigation system (INS), in particular to the initialization and update of such INS during its operation, and to a method for operating it.

BACKGROUND OF THE INVENTION

The purpose of an Inertial Navigation Systems (INS) is to compute and provide a navigation solution to a platform on which it is installed. A navigation solution consists of the Position, Velocity and Attitude (PVA) of the INS with respect to the Earth. An INS computes a navigation solution based on the dead-reckoning principle: given the initial position, velocity and attitude of the platform (referred to as "initial conditions"), continuous readings from the sensors of the INS are used to keep an updated navigation solution even and particularly when the platform is in a dynamical state. Two different classes of Inertial Navigation System essentially exist: Inertial platform and Strap-Down.

An "inertial platform" navigation system consists of a gimbaled sensor assembly (hereinafter, "inertial platform" or simply "platform"), including angular rate gyros (or free gyros) and accelerometers. Using the measurements sensed by the sensor and actuators mounted on the gimbals, the platform is maintained leveled and pointed to the north during the whole operation. The azimuth is maintained by an adjacent gimbaled high quality mechanical free gyro that points to the north via a mechanical process known as mechanical gyro compassing. Inertial platforms INS are usually large, heavy, very expensive and highly accurate and mostly found in earlier applications, or in applications where extremely high accuracy is required.

On the other hand, a Strap-Down (SD) INS, sometimes referred to in the literature as analytic platform, normally comprises of at least three angular rate sensors (usually rate gyros) and three accelerometers that provide angular and linear measurements of the dynamics of the INS frame. The sensor assembly is known in the art as Inertial Measurement Unit (IMU) or Inertial Sensors Unit (ISU). Algorithms that are provided at a computation unit of the INS utilize the measurements of the gyros and accelerometers to continuously provide a navigation solution—PVA. Modern inertial navigation systems are mainly of the Strap-Down type. The present invention is applied to the SD class of INS, and hence for the sake of simplicity, from this point on the term INS would in fact be referred to SD INS.

Typical modern gyroscope types Inertial Navigation Systems include MEMS (Micro Electro Mechanical Systems), FOG (Fiber Optic Gyroscope), RLG (Ring Laser Gyroscope) and DTG (Dynamically Tuned Gyro). One can identify several grades in the INS market: low or commercial grade (small and lightweight systems), tactical grade (as in small Unmanned Air Vehicles), navigation grade (as in aircrafts) and strategic grade (as in ships & submarines). Usually the grade of an INS depends on the grade of its gyros.

Higher grades INS, under certain circumstances, are capable of autonomously calculating their initial conditions (true heading, pitch and roll) by means of a process known as Gyro-Compassing (GC). The process of gyro-compassing requires static conditions, during which the sensitive gyros and accelerometers of the INS measure the Earth gravity and rotation vectors, and given these measurements, an algorithm within the INS determines the three angles of the INS with respect to the Earth with accuracy which depends on the quality of the IMU components (gyros and sensors).

Gyro-compassing can also be implemented under dynamic conditions assuming that an external source of information about the platform dynamics is provided. This process is known in the literature as transfer-alignment or in-motion-alignment. The invention disclosed herein, however, deals only with gyro-compassing under static conditions, and so this condition is assumed hereinafter.

Once said initial conditions are determined, the IMU can be used to track dynamic changes so as to provide continuous navigation data. Since all the INS components are prone to some errors, once the system is no longer stationary, and changes are measured relative to the initial state, the inaccuracy of the updated position data increases with time as a function of the inaccuracy in the components and, to a lesser extent, the trajectory. In modern inertial navigation systems, external references, such as GPS measurements, are often used to limit the maximum total error to some constant values that depend on the quality of the additional equipment.

The initial conditions may also be provided to the INS from an external source, such as a stage based north finding system (NFS). A stage based NFS typically comprises at least one gyro and at least one accelerometer that are mounted on a rotatable stage. The stage is a leveled platform whose orientation may be changed about one axis. The stage axis of rotation is vertical—"Z axis" similar to "Z" axis demonstrated in FIG. 1.

Typically, the north finding measurement in the NFS is performed by two gyros and two accelerometers at two separate orientations of the stage, e.g., 0° and 180°. Typically, the gyros and accelerometers used for NF are aligned with the stage horizontal axes (X and Y similar to the respective axes demonstrated in the FIG. 1). Measurement errors due to components inaccuracies that occur in a single orientation measurement (e.g., 0° measurement) are cancelled out by performing a combined measurement at two separate orientations, e.g., 0° and 180°. This principle will be demonstrated later on bellow. Therefore, NFS measurements of the true north are considered much more accurate compared to the gyro-compassing method. However, a high quality stage-based NFS is very expensive—its price is comparable to the price of an entire INS device. Therefore, even though the measurement of the initial conditions by stage-based NFS is more accurate, it is rarely used with typical INS devices, in view of the cost.

As noted above, it is extremely important to determine the initial conditions as accurately as possible. A substantial drawback of gyro-compassing (GC) process of the prior art is that the system is required to be static during a prolonged period of time. Such relatively long period could not be shortened in the prior art without harming the accuracy, notwithstanding of the use of high-quality and expensive IMU.

As also noted above, the IMU of a typical gyro compassing based INS of the prior art are installed on a stationary platform. Therefore, in order to obtain the initial conditions with high accuracy, the use of very accurate and expensive IMU is required, and still this process takes a relatively long duration of several minutes. The accuracy of the gyro-compassing north finding determination is typically a function of the grade of components as well as of the period of measurement. Typically, the longer the process period, a higher accuracy is obtained for a given IMU.

In view of the above, gyro-compassing can only be performed if the IMU of the INS is very accurate, and hence gyro-compassing is traditionally limited to large and expensive navigation systems, this being one of the main drawbacks of the gyro-compassing procedure. As mentioned, once the position of a static system has been initialized from an external source and attitude has been estimated using gyro-compassing, the system is free to move since the inertial sensors of the INS can measure and track any dynamics that the INS may go through. Essentially, the navigation algorithm of the INS numerically integrates the readouts of the inertial sensors in order to continuously update the navigation solution (PVA) and provide it to a host system.

Since the navigation algorithm is basically a numerical integration process, errors in the inputs to the algorithm tend to accumulate during the operation. Once a system is no longer static and changes are measured relative to the initial state, and if left uncompensated, then these errors will grow unboundedly. Indeed, errors in PVA initialization of the algorithm, together with sensor errors during operation, cause deterioration of the performance along time. To summarize, accurate initial conditions and low sensors errors are extremely important to the overall PVA accuracy. To be more specific, errors in the initial conditions are of the major contributors to the total navigation solution errors. If navigation errors cannot be kept bounded by using external references, like the Global Positioning System (GPS), then the importance of accurate initial conditions becomes critical. It is to be noted that the availability of external references is sometimes limited.

The present invention provides initialization of the azimuth in accuracy beyond the accuracy achievable by a standard gyro-compassing procedure. Furthermore, and as will be elaborated hereinafter, by utilizing the north finding (NF) procedure at static periods during mission, the system of the present invention presents a significant reference for the INS algorithms. For the sake of convenience, the system of the invention will be referred to briefly as "stage mounted INS".

It is an object of the present invention to provide an improved INS system that allows obtaining a more accurate determination of the direction to true north than the one achievable by use of a conventional gyro-compassing process. More specifically, an object of the present invention is to achieve either higher accuracy for a given duration of the process, or to achieve a given accuracy in a shorter process period compared to the prior art gyro-compassing process. Moreover, an object of the present invention is to provide a system which in turn provides a new reference for navigation updates.

It is another object of the invention to provide a system that overcomes the aforementioned drawbacks of the prior art, namely, a system that can be used in an inertial measurement system of a lower grade than required by traditional gyro-compassing based INS.

Other objects and advantages of the invention will become apparent as the description proceeds.

SUMMARY OF THE INVENTION

The invention relates to an improved Inertial Navigation System (INS), which comprises: (a) an INS unit which comprises: (a.1) an IMU which in turn comprises a set of at least three gyros and at least three accelerometers, all mounted on a rotatable stage; and (a.2) an INS algorithm for measuring the behavior of said gyros and said accelerometers during a mission, and calculating a navigation solution based on said measurements; and (b) a north finding determination unit, which comprises: (b.1) one or more from said IMU gyros and one or more from said IMU accelerometers; and (b.2) a north finding algorithm which utilizes measurements from said one or more north finding gyros and one or more north finding accelerometers during an initial conditions stationary state in which the stage is positioned in at least two separate stationary orientations, said north finding algorithm determines a north finding solution which is provided to the INS unit for initializing its said INS algorithm.

Preferably, the system further comprise a stage positioning controller and motor for positioning said stage in said at least two stationary orientations during said stationary state, and managing the stage during dynamic sessions according to said INS algorithm requests.

Preferably, said initial conditions are the true north attitude which in turn comprises pitch and roll components, and sensors estimated errors.

Preferably, said at least two separate stationary orientations comprises a 0° orientation and a 180° orientation.

Preferably, said INS algorithm further looks periodically for said stationary state in order to reactivate during this state the north finding algorithm, which in turn updates the INS algorithm by new initial conditions.

Preferably, said stage is positioned on gimbals.

Preferably, the system further comprises gimbals that are positioned on said stage.

The invention also relates to a method for performing navigation which comprises: (a) providing a north finding determination unit, which comprises: (a.1) one or more from said IMU gyros and one or more from said IMU accelerometers; and (a.2) a north finding algorithm which utilizes measurements from said one or more north finding gyros and one or more north finding accelerometers during an initial conditions stationary state in which the stage is positioned in at least two separate stationary orientations, said north finding algorithm determines a north finding solution which is provided to the INS unit for initializing its said INS algorithm; (b) providing an INS unit which comprises: (b.1) an IMU which in turn comprises a set of at least three gyros and at least three accelerometers, all mounted on a rotatable stage; and (b.2) an INS algorithm for measuring the behavior of said gyros and said accelerometers during a mission, and calculating a navigation solution based on said measurements; (c) providing a north finding determination unit, which comprises: (c.1) one or more from said IMU gyros and one or more from said IMU accelerometers; and (c.2) a north finding algorithm; (d) performing by said INS unit a navigation solution; and (e) monitoring the behavior of said gyros and said accelerometers for determining stationary states; and (f) during each of said stationary states determining the true north attitude by said north finding algorithm, and providing a north finding solution to said INS algorithm.

Preferably, said north finding solution is the true north direction, which comprises pitch, roll and sensors drifts and biases.

Preferably said at least two separate stationary orientations, are a 0° orientation and a 180° orientation.

Preferably, said monitoring for determining a stationary state is performed by said INS algorithm.

Preferably, said stage is positioned on a gimbal.
Preferably, gimbals are further provided on said stage.

DETAILED DESCRIPTION OF THE INVENTION

Figure 1:
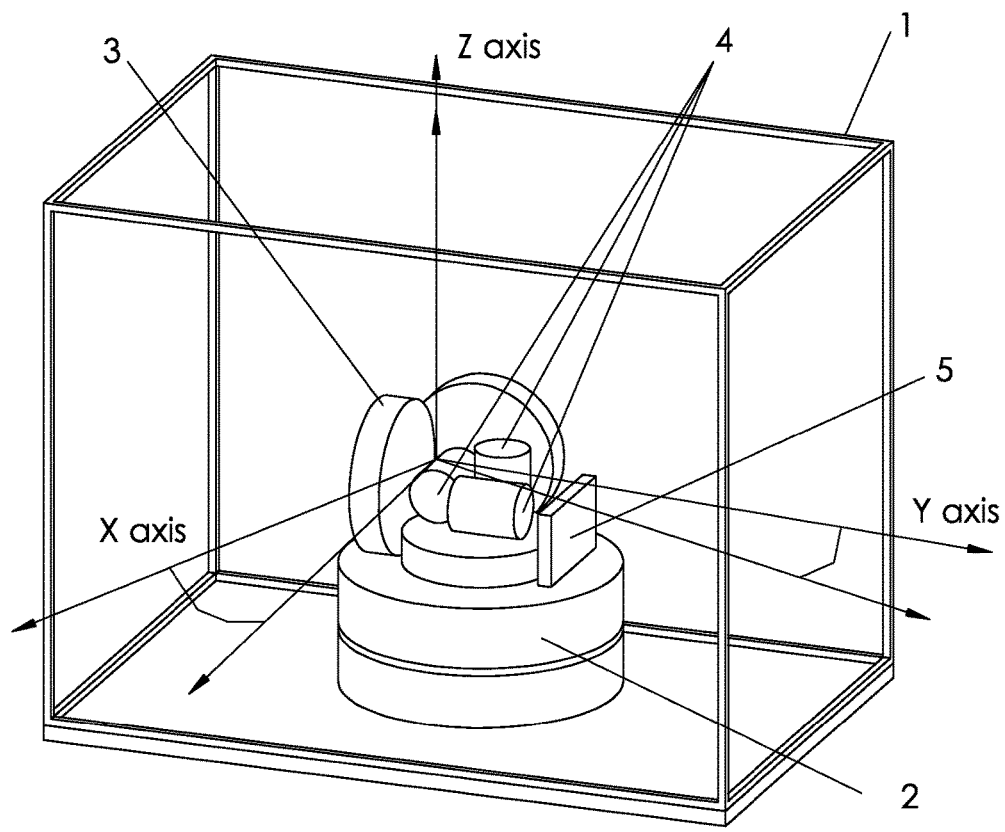
FIG. 1 schematically illustrates a "centralized" design of an INS, including an IMU mounted on a stage, together with a control and computation unit, assembled in a single casing.

FIG. 1 schematically illustrates a first, so-called "centralized" embodiment of the INS of the present invention. Casing 1 defines the axes of the system to which the attitude solution is related. The IMU components are mounted on a disk-shaped rotatable stage 2, which is rotatable around axis Z to desired angles. Sensors, which for clarity are not shown in the figure, are also provided for reading the actual orientation of stage 2 relative to the case 1. The rotating stage 2, together with the IMU components, and control and computation module 5, are assembled within a single casing 1. The gyros 3 of the IMU, together with corresponding accelerometers 4 are used to measure the Earth rotation rate and acceleration. The control unit 5 manages the operation of the stage 2, performs sensors samplings, execution of the algorithms and communications. Note that Z axis is the vertical body axis, to which the stage rotation axis is aligned. The closer the stage rotation axis (Z axis) to the vertical, the better performance NF algorithm achieves. The IMU sensors aligned with X and Y axes of the stage are the ones contributing the most to NF performance, and will be referred to hereinafter as XY sensors.

In the preferred embodiment the IMU is an off-the-shelf component, like the HG1700 manufactured by Honeywell. On an alternative preferred embodiment the Z axis gyro is a higher grade sensor, like gyro model 53 manufactured by Al Cielo, and the XY sensors are lower grade model 52 sensors by the same manufacturer.

As will be elaborated, the design of FIG. 1 provides determination of the NF solution for initial conditions in a stationary state. Typically the stationary state which is used in accordance to the present invention comprises two or more stationary positions of the stage. Next, after determination of the initial conditions, conventional INS functionality in a dynamic state is performed. During dynamic state the INS may choose to manipulate the stage to various angular positions if it is beneficial to the navigation algorithm performance, otherwise the stage normally be fixed to a predefined position (e.g. zero angle).

In contrast to the gyro-compassing based INS of the prior art which IMU is mounted on a stationary base, the IMU within the INS of the present invention is mounted on a rotatable stage. More specifically, at least the IMU sensors of the INS of the present invention are mounted on a stage which is rotatable about one axis, usually the vertical Z axis as illustrated in FIG 1. The initial conditions of the INS (true north pitch and roll) of the present invention are obtained using the stage based NF concept with the measurements given by the IMU sensors. As with the common NFS, the design of the NF algorithm dictates which of the IMU sensors will be involved in attaining the NF solution. Typically, the NF algorithm may be designed to use one or two of its horizontal (aligned with X and Y stage axes as in FIG. 1) gyroscopes and one or two corresponding accelerometers, or it can utilize the whole IMU readouts to calculate NF solution. Hereinafter, "NF components" would refer to the IMU sensors used by the specific NF algorithm. As will become apparent to the skilled person, by operating according to the invention greater accuracy can be obtained than is afforded by the conventional gyro-compassing procedure using same grade of inertial components.

As will be demonstrated further on, NF algorithm yields, in addition to three attitude angles, also an estimation of some of the sensors errors. The navigation algorithm can utilize such information, together with the attitude, calculated by NF algorithm, as an extended navigation reference.

As previously discussed, the prior art gyro-compassing based Inertial Navigation Systems rely on measurements of the respective IMU gyros and accelerometers during a static period, in order to accurately reconstruct Earth's rotation and gravitational vectors. Mathematical manipulations on these measurements yield the initial conditions (true heading, pitch and roll) for the INS. Some major contributors to the inaccuracies of the gyro-compassing process are the long term error measurements of the gyros and accelerometers. Long term errors in gyros and accelerometers are also referred to in the art as long term drift and long term bias respectively.

It is known in the field of inertial navigation and north finding that by mounting the IMU (gyros and accelerometers) of the INS on a stage, the long term errors of the gyros and accelerometers that are mounted on the plane of the stage (X-Y plane) can be accurately estimated and accounted for. Compensating for these errors by subtracting the estimated long term errors from the instantaneous readings of the sensors yields equivalent sensors with a superior accuracy—at least for a given period of time. That period of time (also known in the literature as sensors instability correlation time) is a characteristic of the sensors in use. Since during that period of time it can be assumed that the effective gyros and accelerometers in use are of a superior performance, the true north calculated with their readings is of a higher accuracy. As will be described below, the superior angular accuracy is achieved by pointing the stage to at least two separate orientations and processing the NF sensors outputs.

It follows that in the present invention NF algorithm runs side by side with the inertial navigation algorithm, and contributes to its initialization. As described in WO 2011/158228, by the same applicant, the interface between the NF algorithm and inertial navigation algorithm may be bidirectional. Hence when static conditions are applied during normal operation, the NF procedure may be initiated with the latest PVA solution in order to achieve faster convergence.

The use of the above mentioned concept enables better accuracies to the self attitude calculation of high grade gyro-compassing-capable systems. Furthermore, it enables systems with tactical grade and to some extent to low grades, to perform self attitude calculation—which were not possible before.

Figure 2:
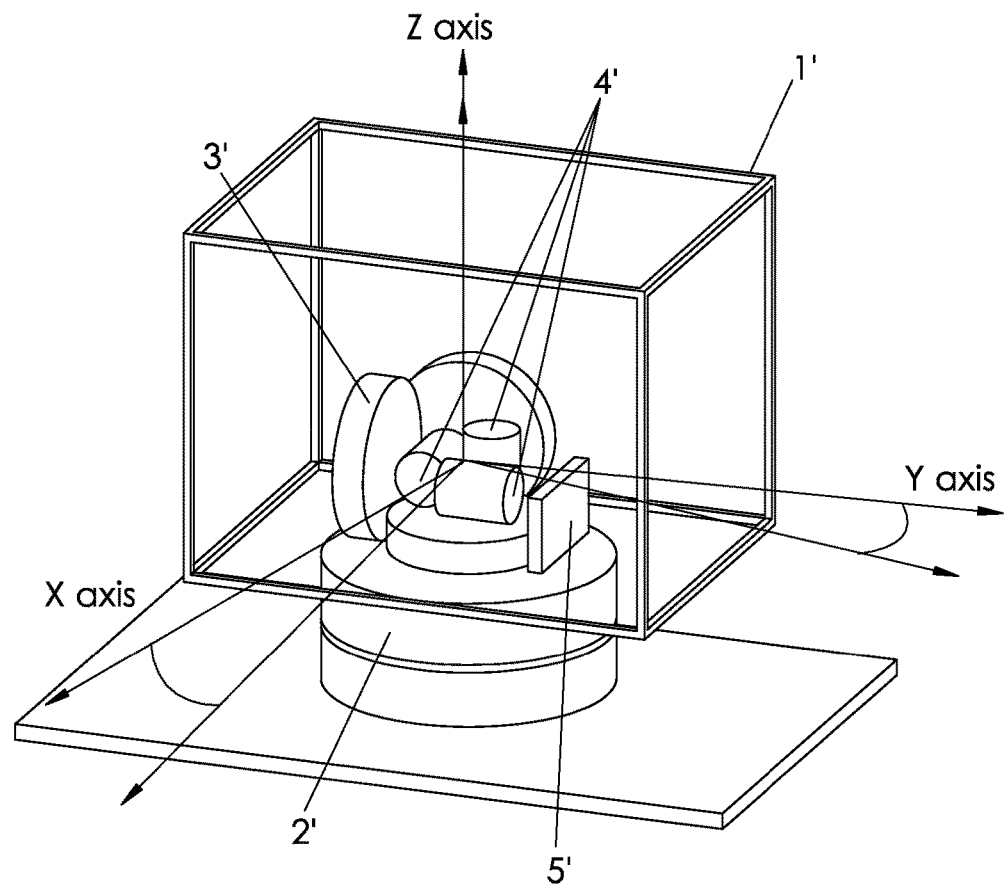
FIG. 2 schematically illustrates an optional "decentralized" configuration of an INS, where the IMU is installed within a subsystem, with said subsystem mounted on a rotating stage within the system.

An alternative embodiment of the present invention with a "decentralized" configuration of the INS is schematically illustrated in FIG. 2. The IMU, comprising the angular rate gyros and accelerometers 3' and 4' respectively, is installed within a subsystem 1', where the subsystem itself is mounted on a rotating stage 2'. Again, also in this embodiment the stationary state which is used comprises two or more stationary positions of the stage. The control and computation module 5' may reside within or external of subsystem 1', therefore the decentralized design allows the various elements of the INS of the invention to be located apart from one another.

As shown, in contrast to the prior art gyro-compassing based INS, where the IMU sensors (the gyros and accelerometers) are mounted on a stationary platform, the IMU sensors in the stage-based INS of the present invention, in both the "centralized" and "decentralized" embodiments, are mounted on a stage which is rotatable about one axis, namely, on a stage which can assume various of selected orientations.

Figure 6:
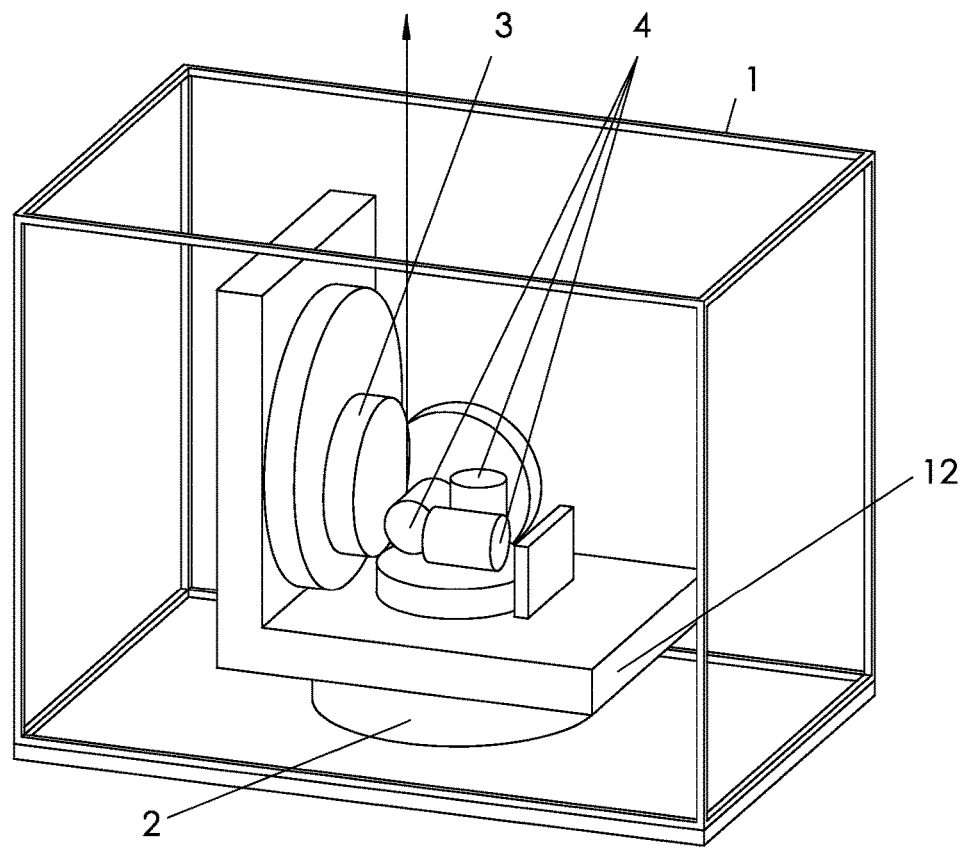
FIG. 6 shows an embodiment of the present invention which comprises gimbals on the stage.

In an optional embodiment of the present invention at least one gimbal is mounted on the stage, and the IMU is mounted on the gimbal. This concept is demonstrated in FIG. 6 for a single gimbal, hereinafter "on-stage gimbal". The gimbal 12 can be placed in at least two positions. In the preferred embodiment the positions are 0 and 90 degrees. By performing the procedure disclosed hereinafter for the two positions, the errors of the sensors can be further estimated. Additionally, if the Z gyro is of higher grade, then the accuracy of the north finding will be further improved.

Figure 7:
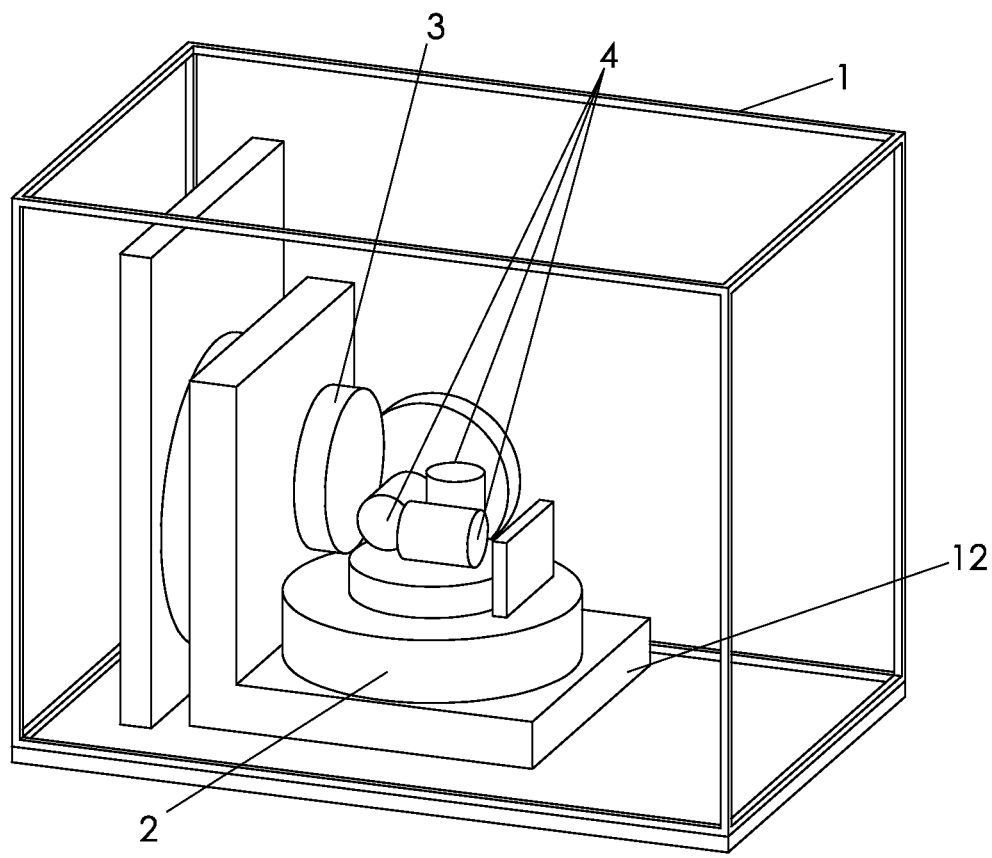
FIG. 7 shows an embodiment of the present invention in which the stage is mounted on gimbals.

In a further embodiment, the stage 2 is mounted on at least one gimbal 12, as demonstrated in FIG. 7 shown for a single gimbal, hereinafter called "off-stage gimbal". This embodiment may be useful, for example, when mounting the invention on an inclined platform. In that case, the gimbal is used to place the stage close to horizontal position.

Two separate algorithms are used in the stage based INS of the invention. A first algorithm, hereinafter, "north finding (NF) algorithm". The solution of the NF algorithm, hereinafter "NF solution", includes, at least, the attitude solution (true heading, pitch and roll) and estimation of some IMU sensors errors. A second algorithm, hereinafter, "the navigation algorithm" or "the INS algorithm", calculates the PVA navigation solution for an output. The INS algorithm receives the NF solution, as determined, from said "NF algorithm", and uses said NF solution both as initial conditions at start and also as occasional reference for navigation updates during static period along operation. Both of said two algorithms operate continuously and symbiotically.

To summarize, in the stage based INS of the present invention, the NF algorithm can be designed to use all of the IMU sensors, although the minimum inputs needed are readings from a single XY gyro and a single XY accelerometer. As is well known, an IMU typically comprises three gyros and three accelerometers (rare IMU assemblies may consist of more than three gyros and three accelerometers. It is yet possible to represent the sensors readings as three orthogonal gyros and accelerometers). In one example of the NF calculation, the stage is first brought to a first stage orientation, for example, a 0° orientation. The stage remains fully stationary in this orientation for some period, for example, 2 minutes. During this period, the entire NF components (i.e., the components that are assigned for NF determination) are sampled, for example, at a 100 Hz rate.

All the acquired NF components samples are stored. In a next step, the same procedure is repeated for a second stage orientation, for example 180°, during a second period, again, for example, 2 minutes, and the corresponding components samples are again stored. The procedure may be repeated for one or more additional stage orientations, although typically two orientations (for example, 0° and 180°) are sufficient to obtain the advantages of the invention over the prior art gyro-compassing based INS. As a rule of thumb, it can be stated that when NF components include both XY IMU readings, two stage positions are sufficient, while using single XY gyro and accelerometer readings cause the need for more than two stage positions. Having all the above samples, as stored with respect to the various NF components, and during each of the stage orientations, the attitude of the stage based INS is determined by the NF algorithm. This determination typically involves, among others, and for each stage orientation, a step of signal processing (usually averaging) of all the respective samples for each component. Next, having a single average value for each NF component and for each of the two respective orientations, the NF algorithm can calculate the attitude of the INS together with sensors drifts and biases—hereinafter the "NF solution". The NF solution, as calculated, is then provided to the INS algorithm for performance of the navigation determination during a dynamic period that follows said initial conditions determination period.

Figure 3:
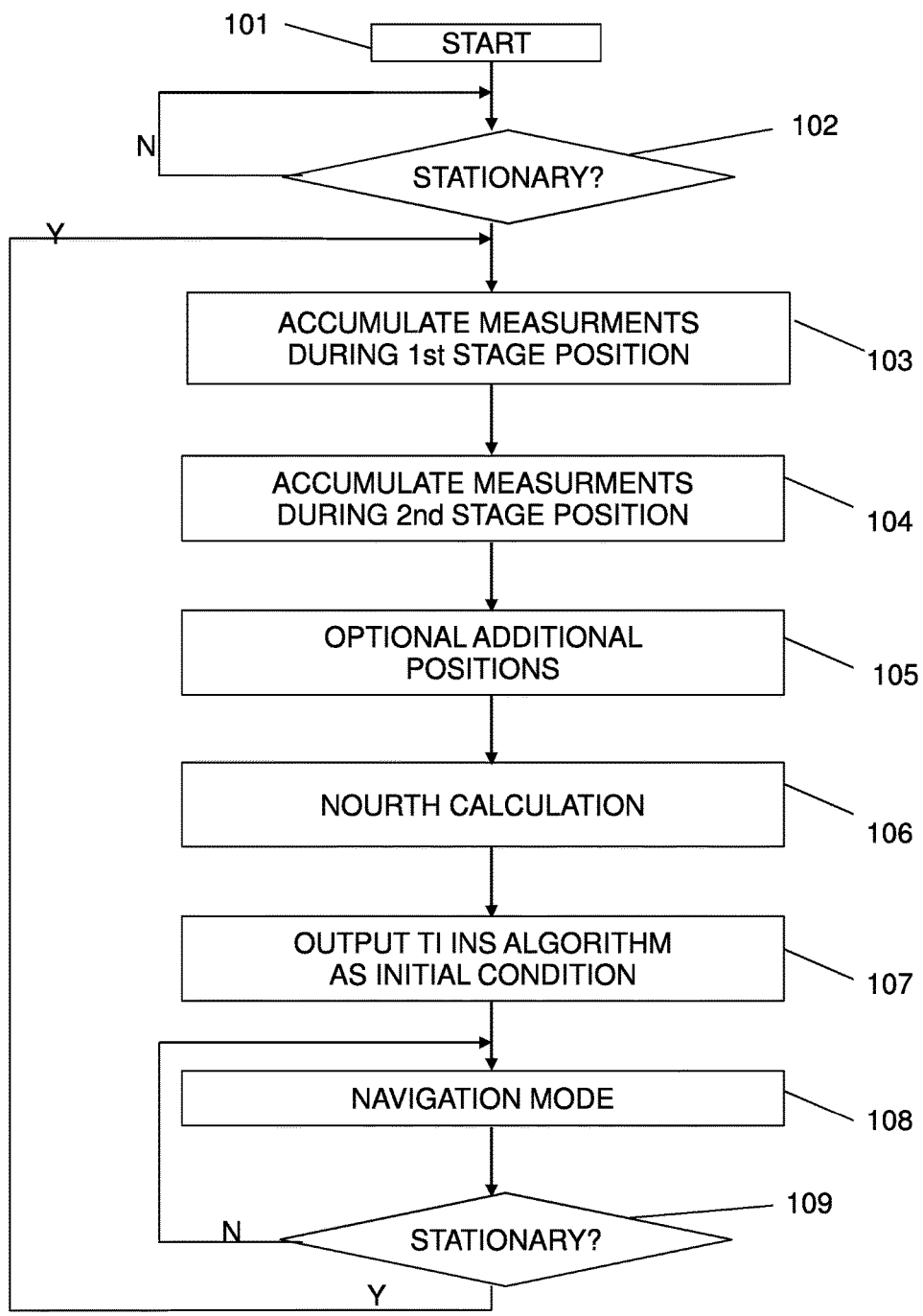
FIG. 3 is a flow diagram describing the initialization process of the navigation algorithm using the outputs of a north-finding (NF) algorithm.

FIG. 3 is a general flow diagram which describes the procedure of the NF algorithm. In step 101, the procedure begins. If present, off-stage and on-stage gimbals are set to their predetermined positions (e.g. off-stage gimbals place the stage in a horizontal position and on-stage gimbal roll to 90 degrees position). In step 102 the procedure assures the existence of a stationary state, otherwise it does not continue. In step 103 the stage is brought to a first stage position (for example, 0° stage position), and remains stationary in this first position. During the first stationary position, the NF components are sampled, and all the sampling data, as accumulated in this position are stored. Next, in step 104 the stage is brought into a second stage position, for example, 180°, and the procedure of step 103 is repeated, and again, the sampled data is stored. The procedures, as performed in steps 103 and 104 may repeat in optional step 105. As before, it can be stated that when NF components include both XY IMU readings, two stage positions are sufficient, while using single XY gyro and accelerometer readings raise the need for more than two stage positions.

Given the measured data, as accumulated in steps 103 and 104, and optionally also in step 105, a north finding calculation is performed by the NF algorithm in step 106, and in step 107 the NF solution of said north calculation (true heading, pitch roll, drifts and biases) is provided into the navigation (INS) algorithm.

In step 108 the INS algorithm receives the NF solution, and takes it either as initial condition if in INS algorithm initialization, or as an "alignment update" for performing transfer alignment as part of the INS algorithm during continuous mission operation. As mentioned, alignment updates are based on incorporating measurements from references (such as GPS, NF, magnetometers etc.) into the navigation solution by the INS algorithm. When no reference is available, the INS algorithm performs SD calculations (strap-down calculations—numerical integration on the IMU readouts) to continuously update the navigation PVA solution. On-stage and off-stage gimbals, if present, might be set to their predetermined position relevant for continuous navigation and in-motion-alignment positions (e.g. on-stage gimbals set to zero angle and off-stage gimbals maintain their position).

In step 109, a repeated verification is made to check whether the system again enters a stationary state. As long as a stationary state is not detected, the system performs strap down calculations in the navigation mode (state). If, however, an external reference is available, then the navigation unit may perform alignment calculations as well. During the dynamic sessions the navigation algorithm may manipulate the stage to different orientations, for the benefit of the navigation algorithm. However, when a stationary state is determined, the system reinitiates NF algorithm 103 and the north determination procedure is again repeated, while the SD calculations in the navigation algorithm continues.

Figure 4:
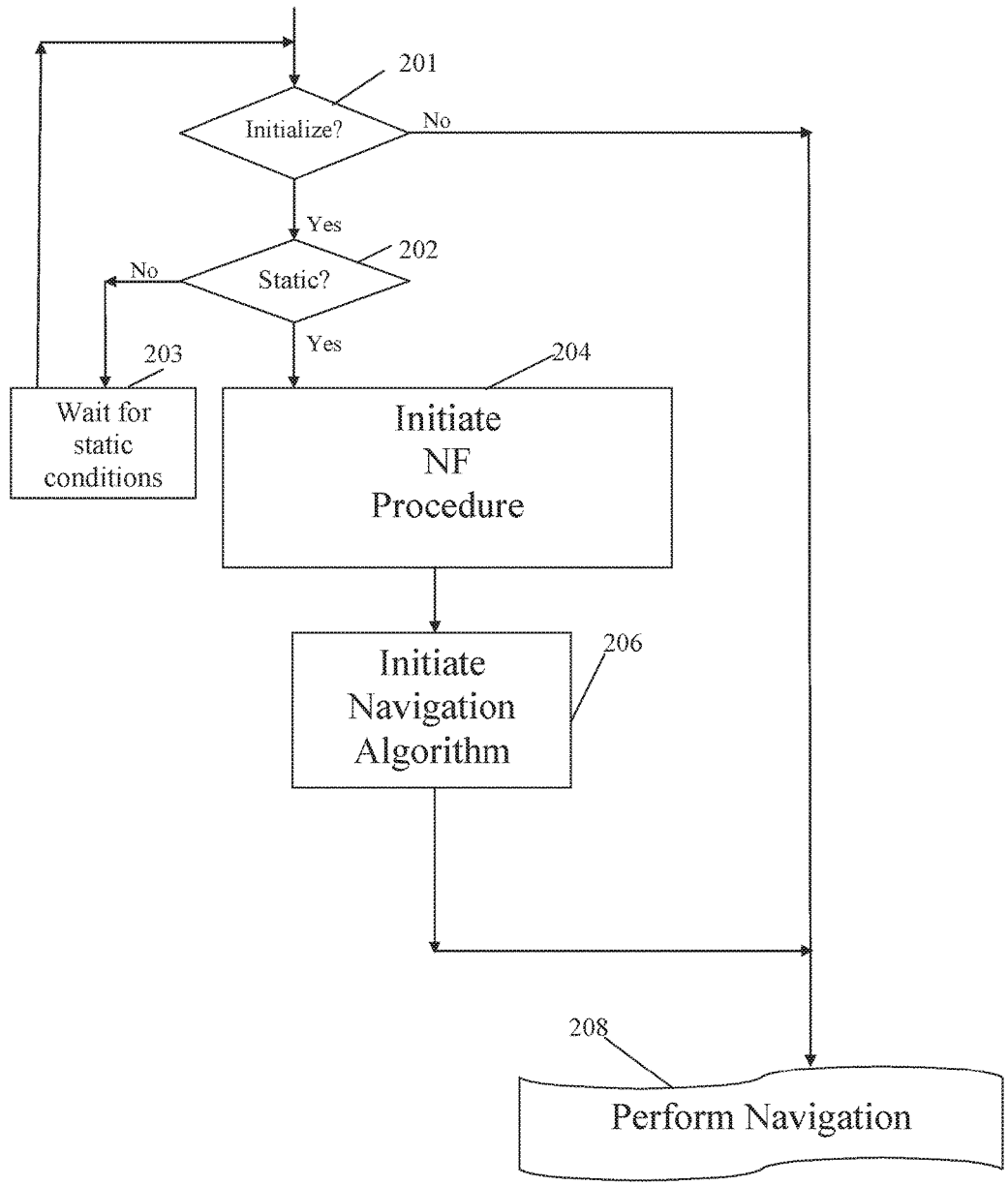
FIG. 4 is a flow diagram describing the incorporation of a NF procedure during static periods in the mission, while the navigation algorithm keeps running.

FIG. 4 is a flow diagram illustrating in more details the procedure of finding the initial conditions by the system of the invention. In step 201, the procedure checks whether there is a requirement to determine the initial conditions, typically in order to proceed in navigation. Step 201 may occur either before a beginning of navigation, or during navigation where the update of the initial conditions becomes necessary. If there is no need for initial conditions, the procedure goes to step 208 to continue navigation (assuming that the navigation is already in progress). Otherwise, and assuming that there is a need for determination of the initial conditions, in step 202 the procedure assures a static condition, that allows the determination of initial conditions. If static conditions are determined in step 202 then the system continues to step 204, else the system waits 203 this cycle and returns to step 201. In step 204, the system sets the on-stage and off-stage gimbals to predetermined positions and initiates the NF process. As described in more details with respect to FIG. 3, the NF process involves: (a) aligning the stage to a first direction; (b) accumulating gravity and earth rate measurements using at least a portion of the IMU (i.e., INS) components; (c) repeating sub-steps (a) and (b) with respect to one or more of other stage directions; and (d) calculating the initial conditions based on all the accumulated data in sub-steps (a)-(c), and when completed, forwarding to the navigation algorithm-step 206. It should be noted that sub-step (b) requires a strict stationary condition in order to assure accuracy of the measurement. In step 206 the navigation algorithm is initiated by the new initial conditions, and the navigation algorithm is performed continuously in step 208, based on said initial conditions. The gimbals may change their position to predetermined angle, as part of the system requirements. The navigation algorithm itself is described in FIG. 5.

Figure 5:
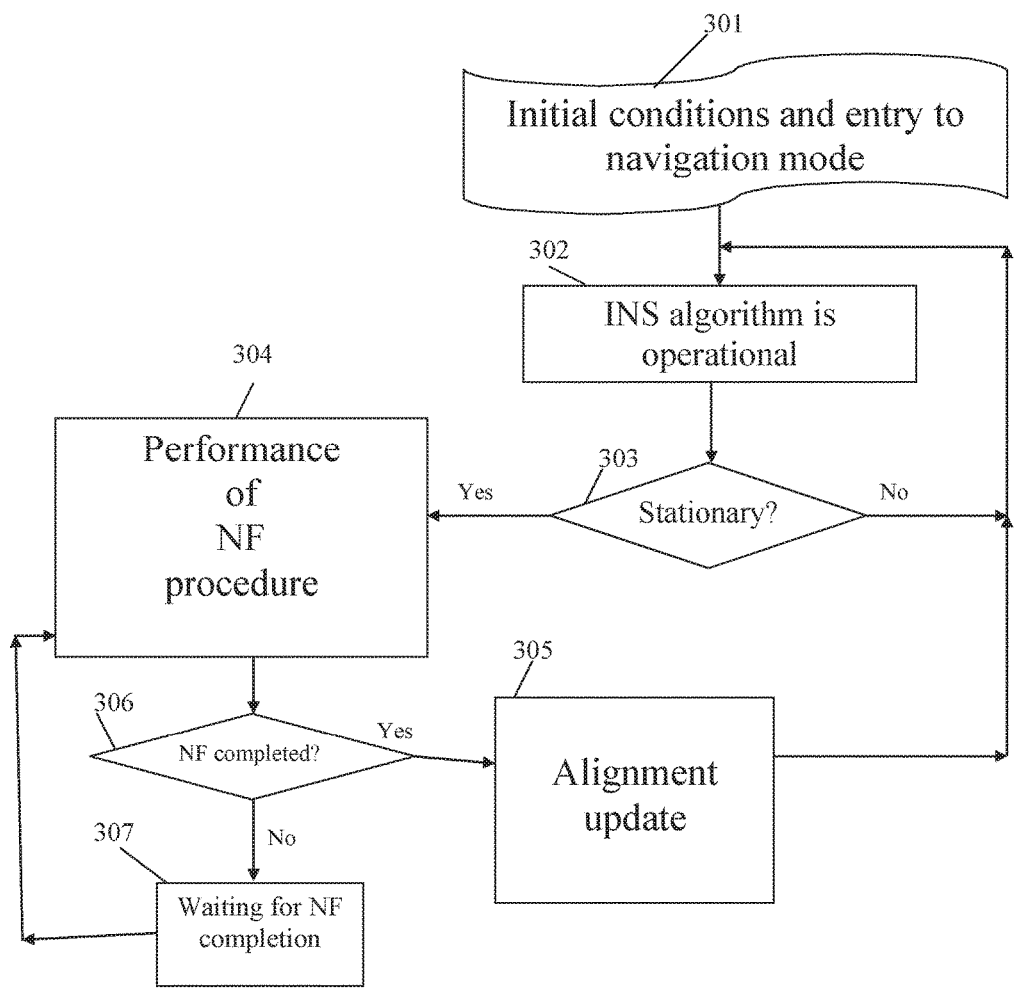
FIG. 5 is a flow diagram describing the INS algorithm.

The flow diagram of FIG. 5 describes the operation of the navigation algorithm. In general, the navigation algorithm continuously provides a navigation solution. However, the algorithm also looks continuously for a stationary state, in order to perform during the stationary state the NF measurements and algorithm, following by an update of the navigation (INS) system, as described with respect to FIG. 4.

In step 301, the system receives initial conditions, and enters the navigation mode. In step 302, the INS algorithm operates continuously, providing a navigation solution by SD calculations. The system may alter the angular position of on-stage and off-stage gimbals during continuous navigation operation following operational or alignment driven considerations. In step 303, the procedure looks for a stationary state, and when such a state is determined, the procedure goes to step 304, in which an NF procedure as in step 204 (of FIG. 4) is performed. The system may set gimbals angles (if present) to predetermined positions for NF session. In step 306 the procedure checks whether the NF procedure is completed. If not, the system goes to step 307, in which the procedure waits for the completion of the NF determination procedure of step 304. When step 306 determines that the NF procedure of step 304 has been completed, the NF solution, as determined, is conveyed to the navigation algorithm, and set the gimbals angles to predetermined positions—if needed. The navigation algorithm incorporates it into the navigation solution by performing alignment update in step 305, and the procedure returns to step 302, in which the SD navigation is again continuously performed.

As demonstrated above, the invention provides a two-unit device which combines a stage based NF unit which operates during a stationary state, and an INS unit which operates continuously, also during a dynamic state, and provides a full navigation solution. The device is advantageous in that the said two units share between them common components. More specifically, the NF unit (i.e., north finding unit) utilizes one or more gyros, and one or more accelerometers ("NF components") from among the set of at least three gyros and at least three accelerometers of the IMU used by the INS unit. Furthermore, during the NF determination period the measurements are made in two or more stage orientations. The stage based NF determination is considered by the art as very accurate, as it typically cancels out drift errors (i.e., inaccuracies that evolve from the components inaccuracies).

The following example briefly demonstrates the advantage of using a stage based north finding device. It should be noted that although this example relates specifically to 0° and 180° stage orientations, these specific orientations are not required, as other stage orientations can be used as well (whether they differ by 180° or not).

EXAMPLE 1

Following is a simplified, yet valid, example demonstrating the use of the stage during the NF session, and how sensors biases cancel out.

Assume the INS is located on the equator and facing north. Setting the stage angular position to 0° causes gyro x to point north. Measurement during this period results in the gyro x measurement of the Earth rotation rate, plus some gyro drift. This measurement may be performed in a rate of 100 Hz, and may yield an average value of gyro_reading_0° of:

gyro_reading_0°=+earth_rate+gyro_drift

Setting the stage angular position to 180° causes gyro x to point south. During this period gyro x measures "minus" the earth rotation rate, plus a gyro drift. This measurement may be performed in a rate of 100 Hz, and may yield an average value of gyro_reading_180° of:

gyro_reading_0°=−earth_rate+gyro_drift

Subtracting the two readings yields:

delta_gyrox=gyro_reading_0°−gyro_reading_180 °=2*earth_rate

As can be seen, delta_gyrox may be treated as an equivalent gyro without a drift error. Using the same principle for gyro_y yields delta_gyro_y. Using delta_gyro_x and delta_gyro_y for calculation of the north direction yields an improved accuracy determination due to the lack of drift factor in the results.

The same applies also with respect to the accelerometers x and y measurements. Using delta_acc_x and delta_acc_y for the calculation of the pitch and roll angles yields a higher accuracy due to the lack of the accelerometer bias factor in the calculations.

As will be appreciated by the skilled person the invention provides a simple and inexpensive way to overcome the drawbacks of the prior art. Of course, the above description has been given for the purpose of illustration, and is not meant to limit the invention in any way, except as defined in the claims to follow.

The invention claimed is:

1. A combined autonomous device with both true north finding and navigation functionalities, comprising:
 a) an INS unit which comprises:
  i. an IMU which in turn comprises a set of at least three gyros and at least three accelerometers, all mounted on a rotatable stage; and
  ii. an INS algorithm for measuring the behavior of said gyros and said accelerometers during a mission, and calculating a navigation solution based on said measurements;
 b) an inertial-type autonomous true north finding unit, which comprises:
  i. one or more from said IMU gyros and one or more from said IMU accelerometers, said one or more IMU gyros and accelerometers are common to said INS unit and to said true north finding unit; and
  ii. a true north finding algorithm which utilizes measurements from said common gyros and accelerometers during an initial conditions stationary state in which said stage is positioned in at least two separate stationary orientations, said north finding algorithm determines a north finding solution which is provided to the INS unit for initializing its said INS algorithm:
 wherein during navigation, said stage is positioned at a fixed non-rotated orientation or managed between various angular positions.

2. A device according to claim 1, further comprising a stage positioning controller and motor for positioning said stage in said at least two stationary orientations during said stationary state, and managing the stage during dynamic sessions between various angular positions according to said INS algorithm requests.

3. A device according to claim 1, wherein said initial conditions are the true north attitude which in turn comprises pitch and roll components, and sensors estimated errors.

4. A device according to claim 1, wherein said at least two separate stationary orientations comprises a 0° orientation and a 180° orientation.

5. A device according to claim 1, wherein said INS algorithm further looks periodically for said stationary state in order to reactivate during this state the true north finding algorithm, which in turn updates the INS algorithm by new initial conditions.

6. A device according to claim 1, wherein said stage is positioned on gimbals.

7. A device according to claim 1, further comprising gimbals that are positioned on said stage.

8. Method for performing autonomous navigation which comprises:
 a) providing an INS unit which comprises:
  i. an IMU which comprises a set of at least three gyros and at least three accelerometers, all mounted on a rotatable stage; and
  ii. an INS algorithm for measuring the behavior of said gyros and said accelerometers during a mission, and calculating a navigation solution based on said measurements;
 b) providing an autonomous and inertial-type true north finding unit, which comprises:
  i. one or more from said IMU gyros and one or more from said IMU accelerometers, said one or more IMU gyros and accelerometers are common to said INS unit and to said true north finding unit; and
  ii. a true north finding algorithm;
 c) performing by said INS unit a navigation solution calculation; and
 d) monitoring the behavior of said gyros and said accelerometers for determining stationary states; and
 e) during each of said stationary states determining a true north attitude by said north finding algorithm, and providing said true north attitude to said INS algorithm;
 wherein all said gyros, accelerometers, and stage are provided within a same combined device and within a same casing;
 and wherein during said stationary states positioning said stage in at least two stationary orientations, and during navigation managing the stage between various angular positions according to said INS algorithm requests or fixing it at a predefined position.

9. Method according to claim 8, wherein said north finding solution is a true north direction, which comprises pitch, roll and sensors drifts and biases.

10. Method according to claim 8, wherein said at least two separate stationary orientations, are a 0° orientation and a 180° orientation.

11. Method according to claim 8, wherein said monitoring for determining a stationary state is performed by said INS algorithm.

12. Method according to claim 8, wherein said stage is positioned on a gimbal.

13. Method according to claim 8 wherein gimbals are further provided on said stage.

* * * * *